(No Model.) 4 Sheets—Sheet 2.

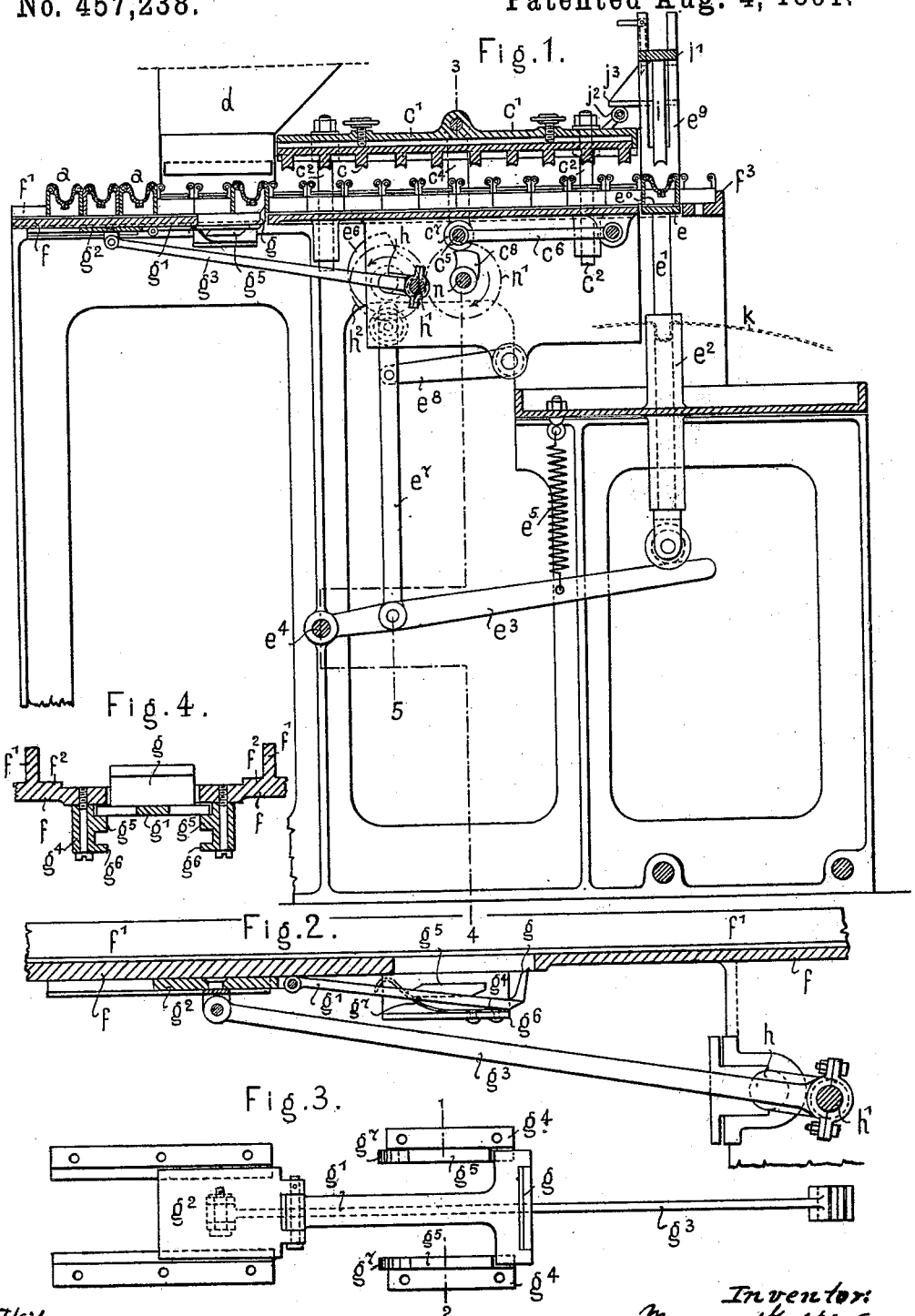

M. VAN GÜLPEN.
MACHINE FOR MAKING CIGAR FILLERS.

No. 457,238. Patented Aug. 4, 1891.

Witnesses:

Inventor:
Max Van Gülpen (No Model.) 4 Sheets—Sheet 3.
M. VAN GÜLPEN.
MACHINE FOR MAKING CIGAR FILLERS.
No. 457,238. Patented Aug. 4, 1891.
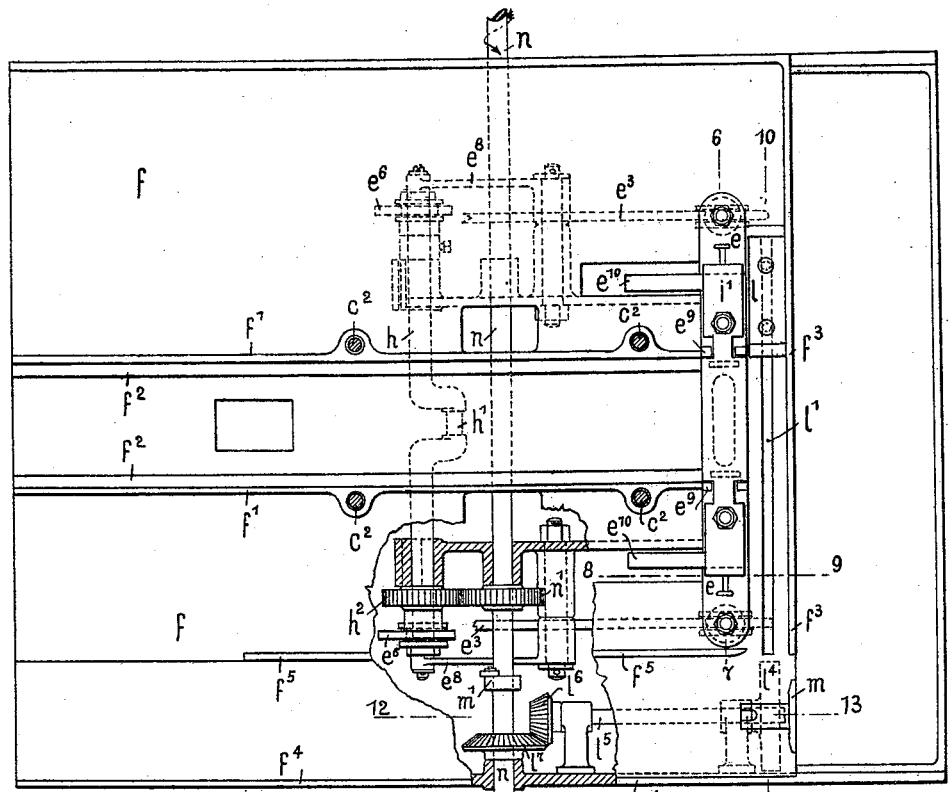
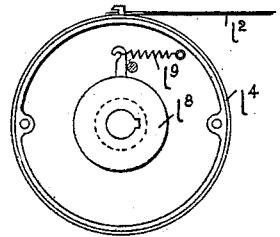
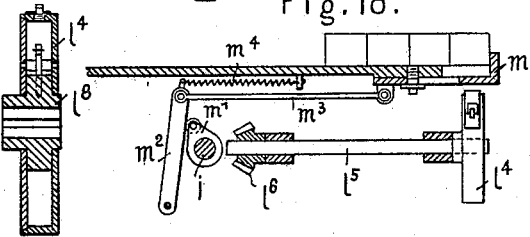
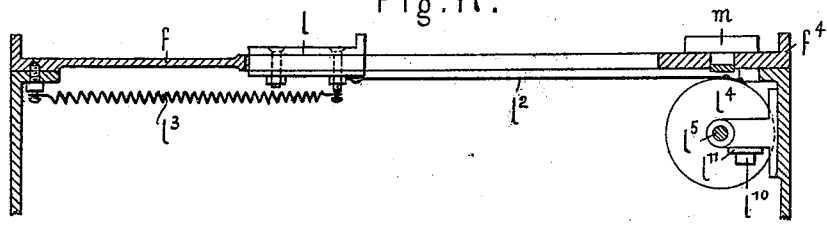
Witnesses:
Inventor (No Model.) 4 Sheets—Sheet 4.
M. VAN GÜLPEN.
MACHINE FOR MAKING CIGAR FILLERS.

No. 457,238. Patented Aug. 4, 1891.

Witnesses:

Inventor:

UNITED STATES PATENT OFFICE.

MAX VAN GÜLPEN, OF MÜLHEIM, GERMANY.

MACHINE FOR MAKING CIGAR-FILLERS.

SPECIFICATION forming part of Letters Patent No. 457,238, dated August 4, 1891.

Application filed April 14, 1891. Serial No. 388,876. (No model.) Patented in Belgium May 12, 1890, No. 90,524; in France May 12, 1890, No. 205,606; in Italy May 14, 1890, LIV, 17; in Norway May 16, 1890, No. 1,874; in Luxemburg May 24, 1890, No. 1,296; in Switzerland July 7, 1890, No. 2,386, and in Spain July 23, 1890, No. 10,854.

*To all whom it may concern:*

Be it known that I, MAX VAN GÜLPEN, a subject of the King of Prussia, residing at Mülheim-on-the-Rhine, Kingdom of Prussia, Germany, have invented new and useful Improvements in Machines for Making Cigar-Fillers, (for which I have obtained Letters Patent in Belgium May 12, 1890, No. 90,524; in France May 12, 1890, No. 205,606; in Italy May 14, 1890, No. 17, Vol. LIV; in Norway May 16, 1890, No. 1,874; in Luxemburg May 24, 1890, No. 1,296; in Spain July 23, 1890, No. 10,854, and in Switzerland July 7, 1890, No. 2,386,) whereof the following is a specification.

My invention relates to the manufacture of cigar-fillers, especially of such as are made from long strips of tobacco-leaves; and its object is to facilitate the production of fillers which possess the proper degree of compactness and which do not expand during the operation of enveloping them in the binder. The means which I employ for this purpose consist in molds of particular construction and in a machine combined with a bunching-machine and in which these molds after having been filled with tobacco by hand are subjected to the different requisite operations. The molds consist in a tray divided lengthwise into two parts, hinged at their top edges to a frame or carrier having springs adapted to keep the tray parts in closing position, but which allow them to spread apart if pressure is applied from the inside. Moreover, devices are provided for in combination partly with the molds, partly with the machine, whereby the tray parts are locked together and unlocked according as this is required. The machine comprises mechanisms and appliances operating to advance the molds step-wise, to compress the tobacco contained in the molds, to convey the filler formed by such compression to the bunching-machine, and to return the empty molds to the attendant.

Figure 6:
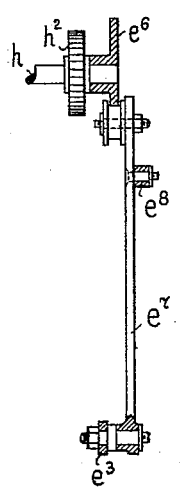
Figure 5:
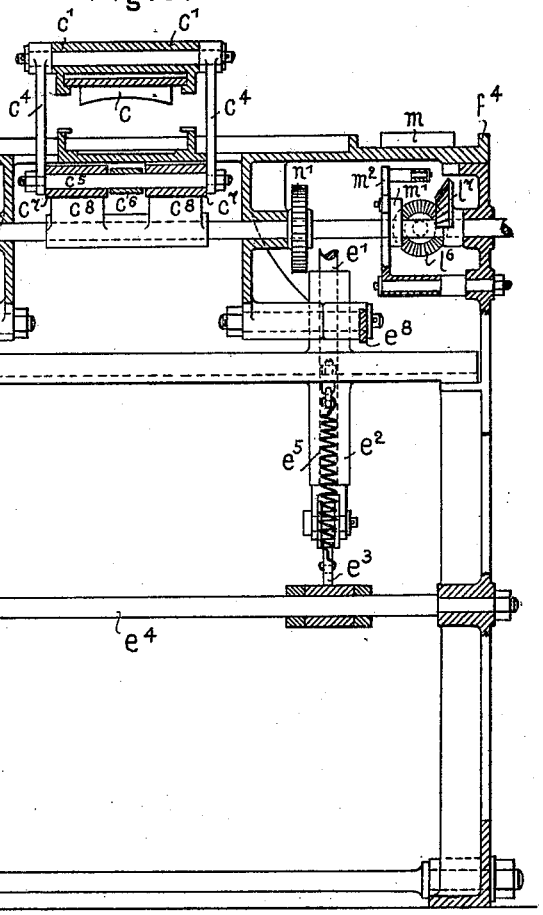
Figure 13:
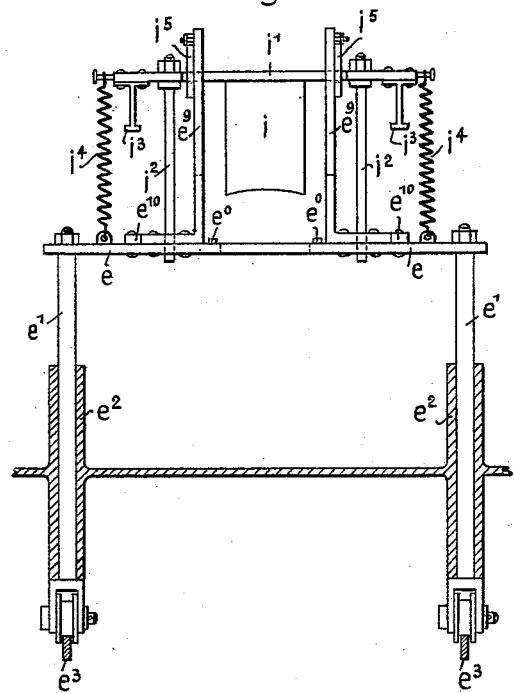
Figure 14:
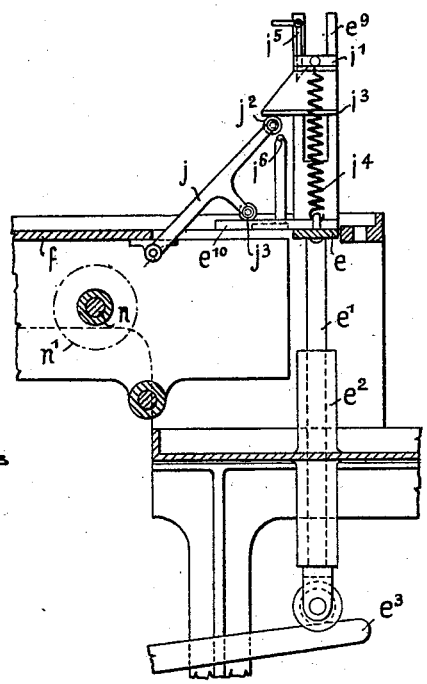
Figure 15:
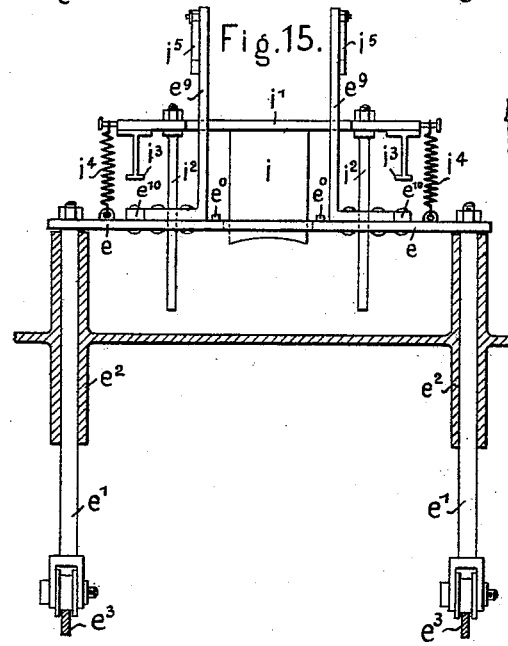
Figure 16:
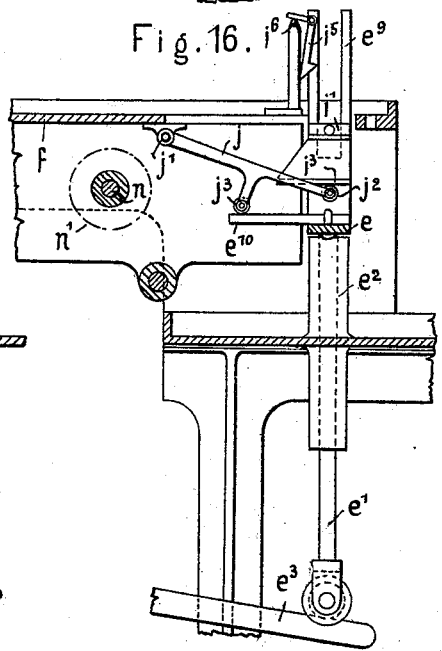

In the annexed drawings, Figure 1 is a sectional elevation of a machine constructed according to my invention. Figs. 2 and 3 show, respectively, in longitudinal section and in plan certain parts comprised in Fig. 1, drawn to a larger scale. Fig. 4 is a transverse section on line 1 2, Fig. 3. Fig. 5 is a transverse sectional view of the machine, taken on the broken line 3 4, Fig. 1. Fig. 6 is a sectional view of a part of the mechanism being in Fig. 1 in the line 5. Figs. 7 to 11 show one of the filler-molds, Fig. 7 being a longitudinal sectional view, Figs. 8 and 9 two transverse sections, Fig. 10 a plan of the carrier, and Fig. 11 a plan of the tray. Fig. 12 is a sectional plan of the machine, a portion of the top plate of the frame being broken away to show the parts below. Fig. 13 is a sectional view on line 6 7, Fig. 12; and Fig. 14, a sectional view on line 8 9, Fig. 12, the latter figure thus comprising a side view of the parts represented in Fig. 13. Figs. 15 and 16 are like views as Figs. 13 and 14, but with the movable parts in different positions. Figs. 17 and 18 are sections corresponding to lines 10 11 and 12 13, Fig. 12. Figs. 19 and 20 finally show a part of the mechanism seen in Fig. 17 in detail.

The main instrument in the making of the fillers is the molds, Figs. 7 to 11. The said mold is composed of a tray $a$ and carrier $b$, the tray being shaped inside according to the form of a cigar and divided lengthwise into two parts hinged at the top to the carrier $b$, so as to be capable of closing together as in Fig. 8, and of spreading apart, as in Fig. 9. By means of two springs $b'$, fixed to the carrier $b$, the tray parts are pressed toward each other, and when the tray is closed thereby the parts are locked together by the locking-pieces $b^2$, constituted by plates arranged to slide freely in vertical grooves cut into the carrier $b$. Each of the pieces $b^2$ is provided at the top with an inwardly-projecting ledge having at its under side a notch $b^3$, corresponding to the projections $a'$ at either end of the tray-halves, and the parts are so arranged that when the tray is closed by the springs $b'$ and the locking-pieces are free to drop, the notches $b^3$ will engage with both pairs of projections $a'$ and keep the tray closed (see Fig. 8) in spite of any pressure on the inside of the same. Whenever the tray is to open, the locking-pieces are pushed upward, so as to disengage them from the projections $a'$, by the means to be described hereinafter.

Fig. 1 shows a series of these molds in their position on the table or top plate $f$ of the machine, some of them being drawn in section, others in outside view. Each mold is placed on the table $f$ between the guide-ledges $f'$. It is filled by hand with tobacco taken from the supply-box $d$, and is thereupon pushed forward against the molds in front of it. The molds are thereby brought one after the other in reach of the working parts of the machine, which perform the following operations: First, the series of molds, beginning with those that are beneath the box $d$, is pushed stepwise forward, so that the molds are brought in register with the counter-mold parts or dies $c$ and that the second one is brought upon the plate $e$. Second, in the intervals of rest of the molds the dies $c$ descend to compress the tobacco in the molds and rise again. Third, during the same period the plate $e$ descends, together with the mold which it carries, and brings the latter close to the bight of the apron of a cigar-bunching machine attached to the filler-making machine. The filler is then pressed upon by a plunger, the tray parts being thereby unlocked and caused to open, and the filler being deposited in the bight of the apron the plate $e$ and the mold thereupon ascend again, while the plunger rises relatively to plate $e$. Fourth, the empty molds are pushed lengthwise one after the other to the side of the machine being to the right of the operator. Fifth, the molds are conveyed back toward the operator.

*Mechanism for advancing the molds*, Figs. 1, 2, 3, 4.—The instrumentality whereby the molds are advanced consists in a driver $g$, integral with an arm $g'$, hinged to a slide $g^2$, which is movable in guides on the under side of the table $f$. The said slide is operated through the rod $g^3$ by the crank $h'$ of a shaft $h$, which is connected by the spur-wheels $h^2$ and $n'$ (both of the same diameter) to the main shaft $n$. The throw of the crank $h'$ is such that the stroke of the driver is equal to about one and one-half times the width of the mold-carriers $b$, and the parts are so arranged that when the driver is at the end of its forward stroke the trays of the molds are in register with the dies $c$. The fore portion of the arm $g'$ forms a cross-head which is conducted by two guides $g^4$, having each two superposed guiding-grooves, as shown to best advantage by Fig. 4, the said grooves being separated from each other by the ledge $g^5$, which is shorter than the undermost ledge $g^6$. To the latter is fixed the spring $g^7$. When the cross-head of arm $g'$ is engaged in the upper guiding-grooves, the driver $g$ projects into one of the molds and slide $g^2$ operates to push the arm $g'$ forward, the driver $g$ in consequence advancing the series of molds. As soon as arm $g'$ arrives at the end of its forward stroke its cross-head passes away over the end of the guiding-ledges $g^5$, so that the arm losing its support by these ledges drops down on the ledges $g^6$, while driver $g$ disengages from the mold-carriers, as represented in Fig. 2. During the receding motion of arm $g'$ thereupon ensuing the cross-head of arm $g'$ passes along the lower groove and engages with the springs $g^7$, which it bends down; but at the moment the cross-head clears the rear end of the ledges $g^5$ the springs $g^7$ throw the arm again into its uppermost position and cause the driver $g$ to engage with the mold-carrier which is now above it. Upon renewed motion forward the driver first advances a short distance without acting, and then on touching against the inner wall of the carrier again operates to advance the series of molds another step. In order that the driver may act only on the inner carrier-wall which is in advance of it, the wall to be placed at the rear has a recess $b^4$, Figs. 8 and 9, for the driver to pass into in case it should happen to meet this wall on rising, while the other wall is beveled outside to prevent the driver, which is also beveled, from striking against the wall from below.

*Mechanism for operating the dies $c$*, Figs. 1, 5, and 12.—The said dies are cast together with a plate secured to another plate $c'$, having guiding-rods $c^2$ sliding in sleeves on table $f$, and whereby the plate $c'$ is so conducted as to be movable up and down without coming out of parallelism with the series of molds below. The plate is connected by two link-bars $c^4$ to a horizontal rod $c^5$, guided by a radius-bar $c^6$, and which carries two rollers $c^7$, the said rollers being acted upon by two tappets $c^8$, keyed to the main driving-shaft $n$. The plate $c'$ is thus raised once during every rotation of the shaft $n$, and is thereupon allowed to descend, so that the dies $c$ are caused to act by the weight of the plate and the dies on the tobacco contained in the molds.

Figure 7:
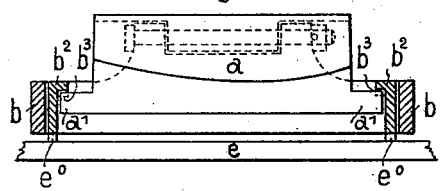
Figure 8:
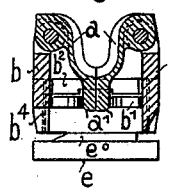
Figure 9:
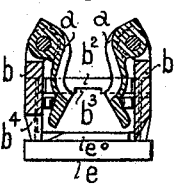
Figure 10:
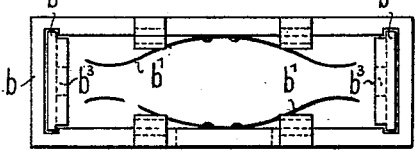
Figure 11:
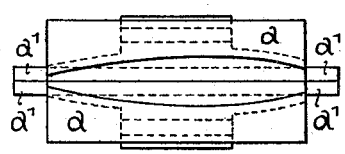

*Mechanism for lowering a mold and pressing out the filler*, Figs. 1, 5, 6, 12, 13, 14, 15, and 16.—The aforesaid plate $e$ fits in a slot cut into the table $f$, and on its upper surface two little ridges $e^0$ are formed, (see also Figs. 7, 8, and 9,) which are adapted to register with the locking-pieces $b^2$ of the mold-carriers. Normally these ridges are flush with the ways $f^2$, on which the carriers slide. The plate $e$ is fixed to two vertical rods $e'$, sliding in the sleeves $e^2$, integral with the machine-frame, the rods having at their lower end rollers, which are acted upon by the levers $e^3$, swinging on the stationary axle $e^4$. The levers $e^3$ are drawn upward by springs $e^5$ and depressed by cams $e^6$, keyed to shaft $h$ and operating on rollers at the upper end of the rods $e^7$, the lower ends whereof are pivoted to the levers $e^3$. The rods $e^7$ are guided by radius-rods $e^8$. To the plate $e$ are fixed two standards $e^9$, having slots in which is movable a plate $i'$, carrying the plunger $i$, the said plate $i'$ being guided by the standards and by rods $i^2$, passing through holes in plate $e$. The plate $i'$ is operated to move relatively to the plate $e$ by means of two levers $j$, pivoted at $j'$ to the table $f$, and carrying each two rollers $j^2 j^3$, the rollers $j^2$ bearing from below against the pieces $i^3$, fixed to plate $i'$, while the rollers $j^3$ run on the arms $e^{10}$, being integral with plate $e$. The plates $e$ and $i'$ are connected together by the springs $i^4$, and to the standards $e^9$ are pivoted the catches $i^5$, having horizontal tails in the paths whereof are arranged stationary disengaging-pins $i^6$. When the parts are in their position of rest, as in Figs. 1, 13, and 14, the plate $e$ is in a level with the table $f$. The plate $i'$ is at the top of its course and is retained by the catches $i^5$, the plunger $i$ being in consequence clear of the molds. The mold being at the time on plate $e$ rests with its locking-pieces $b^2$ on the ridges $e^0$, as shown by Figs. 7 and 8, provided, always, the friction between the locking-pieces and the tray parts be sufficient to keep the tray and the carrier supported. If this should not be the case, the carrier drops until it rests on plate $e$, the tray parts, however, remaining closed, or nearly so, by the pressure of the springs $b'$. Soon after a mold has been pushed onto the plate $e$ the cams $e^6$ operate to depress the levers $e^3$. Plate $e$ in consequence descends by the action of gravity, together with the parts connected thereto, and fetches the mold which it carries close to the bight of the apron $k$. When the combined parts are near the end of their downward course, the tails of the catches $i^5$ strike on the pins $i^6$, the catches being thereby tilted to release the plate $i'$, which is then drawn down, together with plunger $i$, by the springs $i^4$, the lever $j$ being at the time in the position, Fig. 16, in which it does not hinder the downward motion of the plate $i'$. By this motion the plunger is thrust against the filler in the mold below, and, supposing the tray to be still locked by the pieces $b^2$, the plunger, by its pressure on the filler, pushes the mold down relatively to the pieces $b^2$, supported by the ridges $e^0$, and unlocks the tray. The plunger then, by its further pressure on the filler, throws the tray parts open, as shown in Fig. 9, and conveys the filler through the aperture between the tray parts and an orifice in plate $e$ into the bight of the apron $k$. Immediately after this the cams $e^6$ allow the springs $e^5$ to raise the plate $e$ again, together with the empty mold. During this upward motion the arms $e^{10}$, acting through rollers $j^3$ on the levers $j$, cause the rollers $j^2$ to ascend to a greater height than the rollers $j^3$ and to push plate $i'$ and plunger $i$ upward relatively to plate $e$, so that finally plate $i'$ is re-engaged by the catches $i^5$.

*Mechanism for pushing the empty molds sideward*, Figs. 5, 12, 18, 19, and 20.—Between the slot in the table $f$, serving for the reception of plate $e$ and a guiding-ledge $f^3$, space is left for one mold. This space and its prolongation to the right (relatively to the position of the operator) forms the path of a slide $l$, which is so actuated that after the mold emptied last has been pushed forward and into the path of the slide by the following filled mold the said slide will convey the empty mold lengthwise toward the right-hand side of the machine. The slide projects with a rib through a slit $l'$ in table $f$, and to this rib are attached one end of a steel ribbon $l^2$ for drawing the slide forward and a spring $l^3$ for retracting it. The ribbon $l^2$ is fixed at its other end to the periphery of a pulley $l^4$, keyed to a shaft $l^5$, which is connected to the main shaft $n$ by the bevel-pinion $l^6$ on shaft $l^5$ and the bevel-wheel $l^7$ on shaft $n$, the wheel $l^7$ having a segment of rim only, so that shaft $l^5$ is rotated during but a part of the rotation of shaft $n$. In order to prevent an excessive straining of the ribbon $l^2$ if the segmental wheel $l^7$ should not release the pinion $l^6$ at the moment the mold which is being shifted touches against the lateral ledge $f^4$ of the table $f$, the pulley $l^4$ is placed loose on the boss $l^8$ and it is connected thereto by a spring $l^9$, Fig. 19, which yields as soon as any strain is brought to bear on the ribbon from the said cause. Upon the segmental wheel $l^7$, disengaging from the pinion $l^6$, the slide $l$ is retracted by the spring $l^3$, the pulley being arrested in the proper position by a projection $l^{10}$, formed thereon, and which strikes at $l^{11}$ against a stop faced with india-rubber.

*Mechanism for conveying the molds backward*, Figs. 5, 12, 17, and 18.—Rearward of the place which the empty mold occupies after having been shifted sideward a way for the molds to be conveyed backward is formed on the table $f$ by the ledges $f^4$ and $f^5$. The width of this way corresponding to the length of the mold-carriers. Along the said way the molds are pushed stepwise by the slide $m$, having an upright edge, which is normally in a line with the ledge $f^3$, a portion of the latter being cut away for the location of the said edge, and the table $f$, having a slot for the slide to move in. The slide is drawn forward by means of a tappet $m'$ on shaft $n$, acting on the lever $m^2$, which is connected to the slide by the rod $m^3$, and it is retracted by the spring $m^4$, the tappet $m'$ being so arranged that the slide $m$ is drawn forward immediately after a mold has been brought into its path by the slide $l$ and is caused to recede previous to the arrival of the following mold.

I claim as my invention—

1. In a machine for making cigar-fillers, the combination of a series of molds, each consisting in a tray divided lengthwise in two parts, a carrier to which the tray parts are hinged at the top and springs acting on the back of the tray parts, a guiding-way for the molds, means for locking the said parts together and unlocking them, one or more vertically-movable counter mold-pieces arranged above the said guiding-way, and whereby the fillers are compressed, and a plunger operating to press the filler through between the tray parts after these have been unlocked, substantially as described.

2. In a machine for making cigar-fillers, the combination of a series of molds, each consisting in the tray $a$, divided lengthwise in two parts, the carrier $b$, to which the tray parts are hinged at the top, and springs $b'$, acting against the back of the tray parts, a table $f$, with a guiding-way for the molds, means for advancing the molds stepwise, a series of vertically-movable counter mold-pieces adapted to pass into the molds, a vertically-movable plate $e$ being normally in the path of the molds, a vertically-movable plunger $i$, means for lowering and raising the plate $e$ and plunger $i$, and means in connection with the molds and the machine for locking and unlocking the parts of the tray $a$, substantially as specified.

3. In a machine for making cigar-fillers, the combination of a series of molds, each consisting in the tray $a$, divided lengthwise in two parts having the projections $a'$, the carrier $b$, to which the tray parts are hinged at the top, springs $b'$, acting against the back of the tray parts, and locking-pieces $b^2$, movable vertically in the carrier $b$ and having notches engaging the projections $a$, a table $f$, having guiding-ledges $f'$, mechanism for pushing the molds forward stepwise, a series of vertically-reciprocating counter mold-pieces $c$, adapted to pass into the trays $a$, a vertically-movable plate $e$, being normally in the path of the molds and having the ridges $e^0$, adapted to register with the locking-pieces $b^2$, means for lowering and raising the plate $e$ together with the mold standing at the time on the same, a plunger $i$, registering with the tray of the said mold, and means for pushing the plunger downward into the tray after the plate $e$ and the mold have descended, substantially as described.

4. In a machine for making cigar-fillers, the combination of individual molds, mechanism for advancing the said molds stepwise, which consists in the reciprocating slide $g^2$, arm $g'$, pivoted to the slide and having a cross-head and the driver $g$, two pairs of superposed guiding-grooves for the cross-head to slide in and separated from each other by ledges $g^5$, which have such length as to be cleared by the cross-head at each end of its stroke, and springs $g^7$, fixed in the lower grooves and adapted to raise the cross-head at the end of its back-stroke, substantially as specified.

5. In a machine for making cigar-fillers by means of molds, the combination of the carriers $b$, divided tray $a$, and springs $b'$, acting on the tray parts, the mechanism for lowering a mold and expelling the filler, which consists in the vertically-movable plate $e$, the plate $i'$, vertically movable relatively to plate $e$, guides for conducting and springs $i^4$ for connecting together the plates $e$ and $i'$, the plunger $i$, fixed to plate $i'$, means for lowering and raising the plate $e$, a lever whereby the upward motion of plate $e$ is transmitted to plate $i$, so that the latter rises farther than plate $e$, catches $i^5$ in connection with plate $e$ and adapted to arrest plate $i'$ at the end of its upward course, and fixed pins $i^6$, whereby the catches $i^5$ are disengaged from plate $i'$ when plate $e$ is near the end of its downward course, substantially as set forth.

6. In a machine for making cigar-fillers by means of individual molds, the combination of the table $f$, having two parallel pairs of guiding-ledges $f'\ f'$ and $f^4\ f^5$ and the transverse ledge $f^3$, means for advancing the molds stepwise between the ledges $f'\ f'$, a reciprocating slide $l$, moving along the ledge $f^3$ and adapted to push one mold after the other sidewise, and a reciprocating slide $m$, moving parallel to the ledges $f^4\ f^5$ and adapted to convey the molds stepwise backward, substantially as specified.

In testimony whereof I have hereunto set my hand in the presence of two subscribing witnesses.

MAX VAN GÜLPEN.

Witnesses:
G. OELRICHS,
G. W. MALLINCKRODT.